(12) United States Patent
Aukofer et al.

(10) Patent No.: US 8,913,372 B2
(45) Date of Patent: Dec. 16, 2014

(54) POWER SWITCH RECEIVING MODULE

(75) Inventors: Sebastian Aukofer, Amberg (DE); Ladislav Dostal, Zamberk (CZ); Lukas Jerabek, Zamberk (CZ); Libor Krivanek, Kunvald v Cechách (CZ); Christian Rohrwild, Lappersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 530 days.

(21) Appl. No.: 13/219,995

(22) Filed: Aug. 29, 2011

(65) Prior Publication Data
US 2012/0050955 A1 Mar. 1, 2012

(30) Foreign Application Priority Data
Aug. 30, 2010 (DE) .......................... 10 2010 039 934

(51) Int. Cl.
| | |
|---|---|
| *H02B 1/04* | (2006.01) |
| *H01H 71/02* | (2006.01) |
| *H01H 9/08* | (2006.01) |
| *H01H 73/60* | (2006.01) |
| *H01R 13/432* | (2006.01) |
| *H01H 71/46* | (2006.01) |

(52) U.S. Cl.
CPC ............... *H01H 71/025* (2013.01); *H01H 9/08* (2013.01); *H01H 71/46* (2013.01); *Y04S 20/14* (2013.01); *H01H 2300/03* (2013.01); *Y02B 90/224* (2013.01); *H01H 73/60* (2013.01)
USPC ........... 361/636; 361/640; 361/631; 439/188; 439/748

(58) Field of Classification Search
USPC ............................. 361/636, 640; 439/188, 748
See application file for complete search history.

(56) References Cited

U.S. PATENT DOCUMENTS

| | | | |
|---|---|---|---|
| 4,744,001 A | | 5/1988 | Krafft et al. |
| 6,062,914 A | * | 5/2000 | Fasano .......................... 439/716 |

(Continued)

FOREIGN PATENT DOCUMENTS

| | | |
|---|---|---|
| DE | 25 15 152 | 10/1976 |
| DE | 37 05 728 | 9/1988 |
| EP | 0 228 987 | 7/1987 |

*Primary Examiner* — Zachary M Pape
(74) *Attorney, Agent, or Firm* — Harness, Dickey & Pierce, P.L.C.

(57) ABSTRACT

A receiving module is disclosed for building into a switching cabinet, with a primary circuit mating contact element. To improve the coupling of a power switch, especially a low-voltage power switch, to a receiving module, it is proposed in at least one embodiment that the receiving module also has a communication mating contact element, wherein the receiving module can directly receive a power switch, so that a primary circuit contact element of the power switch is directly electrically-conductively connected to the primary circuit mating contact element and a communication contact element of the power switch is directly electrically-conductively connected to the communication mating contact element, wherein the communication mating contact element is arranged in relation to the primary circuit mating contact element such that, in a first receiving position of the power switch in the receiving module the communication contact element is electrically-conductively connected to the communication mating contact element and the primary circuit mating contact element is not electrically-conductively connected to the primary circuit contact element and in a second receiving position of the power switch in the receiving module the primary circuit mating contact element is directly electrically-conductively connected to the primary circuit contact element and the communication mating contact element is directly electrically-conductively connected to the communication contact element.

16 Claims, 7 Drawing Sheets

(56) References Cited

U.S. PATENT DOCUMENTS

| | | | |
|---|---|---|---|
| 6,315,580 B1 * | 11/2001 | Hurtubise et al. | 439/82 |
| 6,402,572 B1 * | 6/2002 | Sevier et al. | 439/748 |
| 7,049,514 B2 * | 5/2006 | Brandt et al. | 174/59 |
| 7,419,394 B2 * | 9/2008 | Jensen et al. | 439/248 |
| 2011/0193690 A1 * | 8/2011 | Frohlich et al. | 340/10.42 |

\* cited by examiner

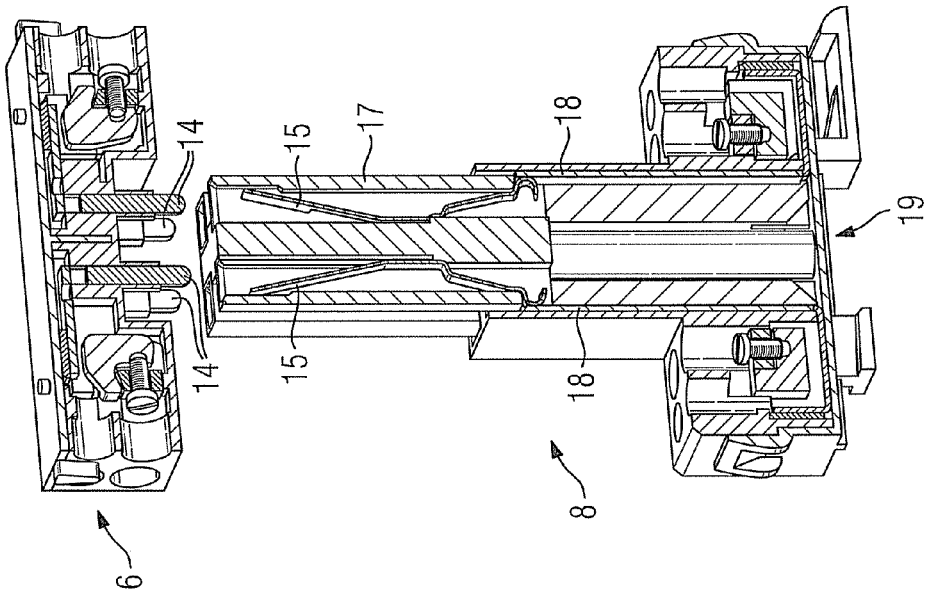
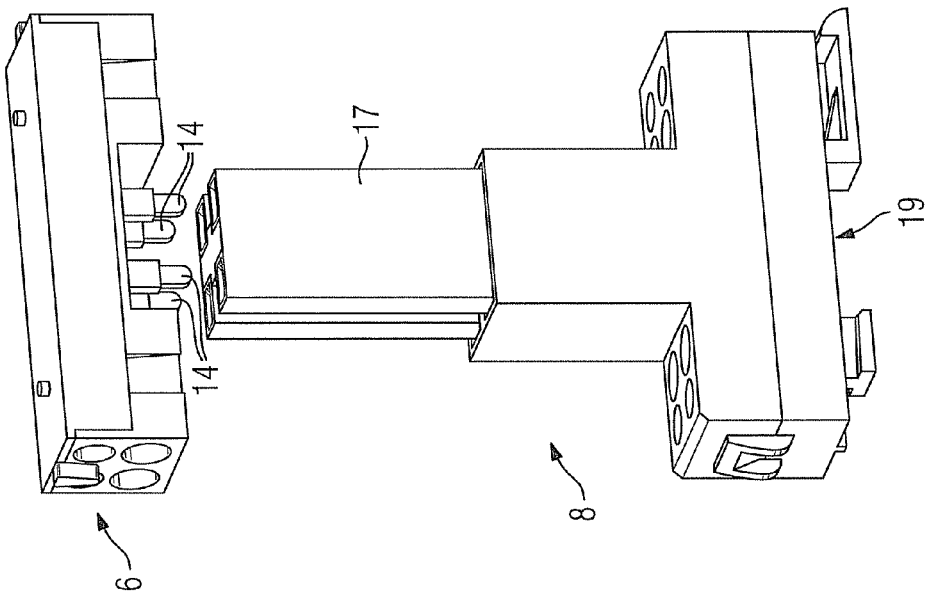

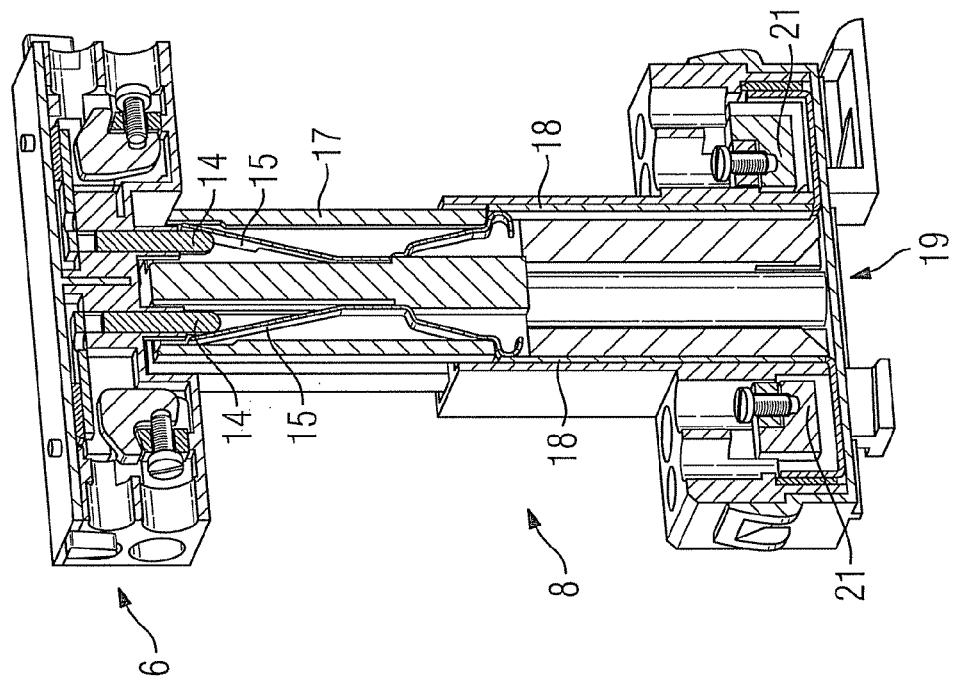
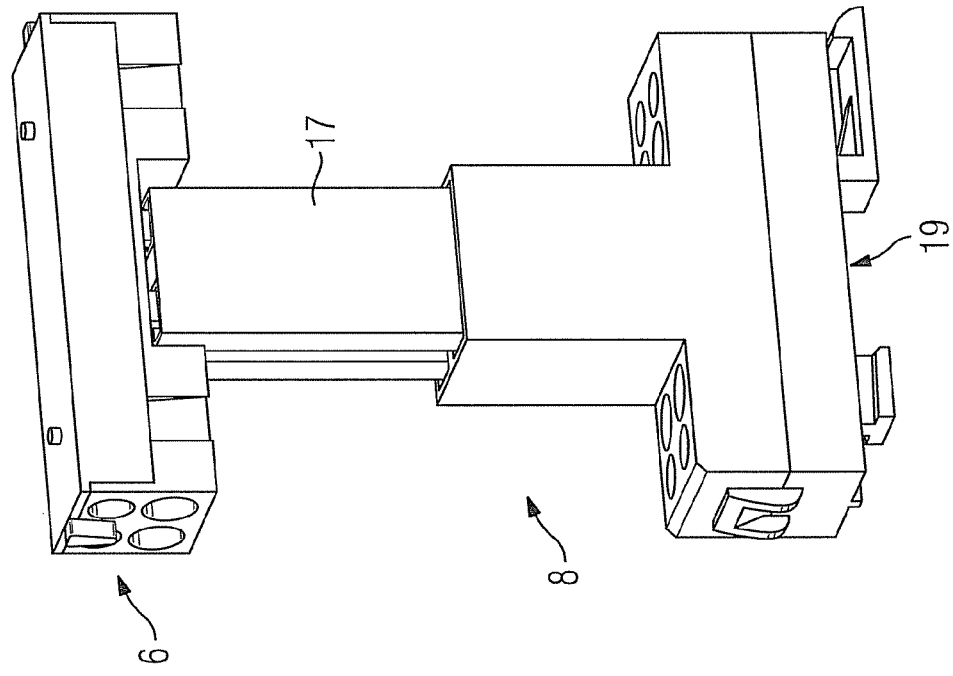

US 8,913,372 B2

POWER SWITCH RECEIVING MODULE

PRIORITY STATEMENT

The present application hereby claims priority under 35 U.S.C. §119 on German patent application number DE 10 2010 039 934.5 filed Aug. 30, 2010, the entire contents of which are hereby incorporated herein by reference.

FIELD

At least one embodiment of the invention generally relates to a receiving module for building into a switching cabinet, with a primary circuit mating contact element, whereby the receiving module can directly receive a power switch, especially a low-voltage power switch, so that a primary circuit contact element of the power switch is electrically-conductively directly connected to the primary circuit mating contact element. At least one embodiment of the invention further generally relates to a power switch system comprising a power switch and a receiving module for receiving the power switch and also to a method for coupling a power switch to a receiving module.

BACKGROUND

In the field of industrial automation technology power switches and here especially low-voltage power switches are built into a switching cabinet via a receiving module and ultimately coupled to a primary circuit of a system to be monitored. Here a receiving module, also termed a withdrawable module or withdrawable frame in everyday parlance, is built into a switching cabinet. The receiving module built into a switching cabinet is connected electrically-conductively to the primary circuit to be monitored of the system to be monitored, so that the primary circuit of the system to be monitored is routed via primary circuit mating contact elements of the receiving module.

Thus the receiving module built into a switching cabinet is electrically-conductively connected to the circuit to be monitored (preferably a primary circuit) of the system and forms with the primary circuit mating contact element(s) the contact point for the power switch, so that the circuit of the system can be monitored by means of the power switch.

A power switch can now be mechanically coupled to the receiving module, so that the circuit to be monitored can be monitored by the power switch. In the coupled state of the power switch with the receiving module the primary circuit contact elements of the power switch are connected electrically-conductively to the primary circuit mating contact elements of the receiving module. The power switch thus establishes an electrically-conductive connection to the circuit of a system to be monitored. A system to be monitored can typically be an electrical machine.

The power switch is usually coupled to the receiving module by way of plug-in technology or push-in technology. With push-in technology the power switch is usually mechanically coupled to the receiving module via a crank. In the mechanical coupling of the power switch to the receiving module the primary circuit contact element of the power switch is thus not initially connected electrically-conductively to the primary circuit mating contact element of the receiving module. Only through the mechanical coupling step will the primary circuit contact element be connected electrically-conductively to the primary circuit mating contact element.

The power switch can have a connection unit via which a power switch accessory module can be connected to the power switch. By way of such a power switch accessory module different additional functions can be undertaken, such as diagnostic functions for example. The switch accessory module connected to a power switch is connected here by means of a single wire connection to an evaluation unit. This evaluation unit communicates with the power switch accessory module via the single wire connection.

SUMMARY

In at least one embodiment of the present invention the coupling of a power switch is improved, especially low-voltage power switch, to a receiving module. At least one embodiment of the invention is especially designed to improve the exchanging of the power switch and connection of the power switch to the receiving module.

In at least one embodiment of the invention, a receiving module for building into a switching cabinet includes a primary circuit mating contact element and a communication mating contact element, with the receiving module able to directly receive a power switch, so that a primary circuit contact element of the power switch is connected electrically-conductively directly to the primary circuit mating contact element and a communication contact element of the power switch is connected electrically-conductively directly to the communication mating contact element, whereby the communication mating contact element is arranged relative to the primary circuit mating contact element such that, in a first receiving position of the power switch in the receiving module, the communication contact element is connected electrically-conductively to the communication mating contact element and the primary circuit mating contact element is not connected electrically-conductively to the primary circuit contact element and in a second receiving position of the power switch in the receiving module the primary circuit mating contact element is connected electrically-conductively to the primary circuit contact element and the communication mating contact element is connected electrically-conductively to the communication contact element.

Further, at least one embodiment relates to a power switch system comprising a power switch and a receiving module for receiving the power switch, whereby the power switch comprises a primary circuit contact element and a communication contact element and the receiving module a primary circuit mating contact element and a communication mating contact element, whereby the receiving module can directly receive the power switch, so that the primary circuit contact element is connected directly electrically-conductively to the primary circuit mating contact element and the communication contact element is connected directly electrically-conductively to the communication mating contact element, whereby the communication contact element and/or communication mating contact element are arranged relative to the primary circuit contact element and/or primary circuit mating contact element such that, in a first receiving position of the power switch in the receiving module the communication contact element is connected electrically-conductively to the communication mating contact element and the primary circuit mating contact element is not connected electrically-conductively to the primary circuit contact element and in a second receiving position of the power switch in the receiving module the primary circuit mating contact element is connected electrically-conductively to the primary circuit contact element and the communication mating contact element is connected electrically-conductively to the communication contact element.

Further, at least one embodiment relates to a method for coupling a power switch to a receiving module, whereby the power switch comprises a primary circuit contact element and a communication contact element and the receiving module comprises a primary circuit mating contact element and a communication mating contact element, whereby on mechanical coupling of the power switch to the receiving module in a first stage of coupling, the power switch to the receiving module, the power switch initially assumes a first receiving position in the receiving module, in which the communication contact element is electrically-conductively connected to the communication mating contact element and the primary circuit mating contact element is not electrically-conductively connected to the primary circuit contact element and in a subsequent second stage of coupling the power switch to the receiving module, the power switch assumes a second receiving position in the receiving module, in which the primary circuit mating contact element is electrically-conductively connected to the primary circuit contact element and the communication mating contact element is electrically-conductively connected to the communication contact element.

Advantageous developments of the invention are specified in the dependent claims.

BRIEF DESCRIPTION OF THE DRAWINGS

The invention and embodiments of the invention will be described in greater detail and explained below with reference to the example embodiments presented in the figures, in which:

FIG. 7a, 7b shows an arrangement of the communication contact in relation to the communication mating contact element in the first switch position, FIG. 8a, 8b show an arrangement of the communication contact element in relation to the communication mating contact element in the first receiving position of the power switch in the receiving module.

DETAILED DESCRIPTION OF THE EXAMPLE EMBODIMENTS

Figure 1:
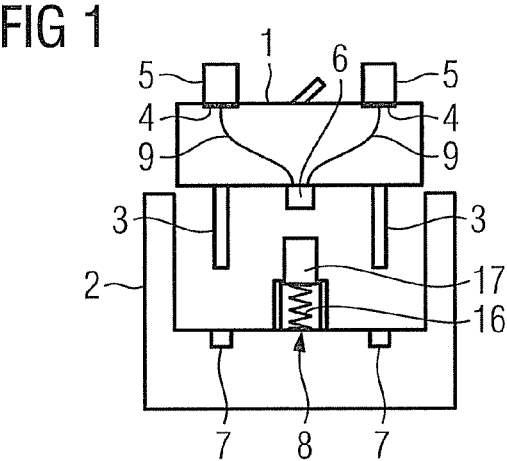
FIG. 1 shows a schematic layout of a power switch system in the non-coupled state.

Various example embodiments will now be described more fully with reference to the accompanying drawings in which only some example embodiments are shown. Specific structural and functional details disclosed herein are merely representative for purposes of describing example embodiments.

The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a schematic layout of a power switch system in the non-coupled state. A power switch 1 as well as a receiving module 2 can be seen in this figure. This power switch 1, especially a low-voltage power switch, is intended for use within industrial automation technology. With this power switch 1 a supply line (a primary circuit) of a system can be monitored. For this the power switch 1 must be coupled to the supply line of the system to be monitored. The power switch 1 is preferably linked to the supply line to be monitored in a switching cabinet.

The power switch 1 can preferably not only switch operating currents and small overcurrents, but can also switch high overcurrents and short-circuit currents in the event of errors, can hold these error currents for a predetermined time and switch off again. Depending on its design, such a power switch 1 can be switched with one pole or three poles. The circuit/primary circuit to be monitored in the system is monitored via a primary circuit contact element 3 of the power switch 1. The primary circuit contact element 3 consists in this case of the two contact elements, so that the circuit to be monitored can be routed through the power switch 1.

So that the power switch 1 can monitor the circuit/primary circuit of an electrical system, the primary circuit contact element 3 of the power switch 1 must be electrically-conductively connected to the primary circuit/the power supply line of the system to be monitored. To simplify coupling of the power switch 1 and especially of the primary circuit contact element 3 to the primary circuit of the electrical system, a receiving module 2 is built into a switching cabinet. This receiving module 2 is electrically-conductively connected to the supply line (primary circuit line) of the electrical system to be monitored such that, via a primary circuit mating contact element 7 of receiving module 2, the power switch 1 can be electrically-conductively connected to the primary circuit of the system to be monitored.

The primary circuit contact element 7 consists in this case of two contact elements, so that the circuit to be monitored can be routed through the receiving module. Thus a receiving module 2 is initially built into a switching cabinet. This receiving module 2 has primary circuit mating contact elements 7, which make possible access to the primary circuit of the electrical system to be monitored.

The power switch 1 can thus be coupled directly to the receiving module 2 by way of plug-in technology or push-in technology, so that by direct contact between the primary circuit contact element 3 and the associated primary circuit mating contact element 7 the current flowing over the primary circuit of a system can flow through the power switch 1 and can thus be monitored. For connecting the power switch 1 to the receiving module 2 by means of plug-in technology, the power switch 1 is merely plugged into the receiving module 2. Likewise the power switch 1 can be coupled to the receiving module 2 by means of push-in technology. For this the power switch 1 is typically mechanically connected by means of a crank to the receiving module 2, so that ultimately direct contact is established between the primary circuit contact element 3 of the power switch 1 with the primary circuit mating contact element 7.

In order to allow further analysis or evaluation of the power switch 1, the power switch 1 has a connection unit 4. In the present case the power switch 1 has two connection units 4. A power switch accessory module 5 is able to be connected directly to the power switch 1 via these connection units 4. The power switch 1 also has a communication contact element 6. This communication contact element 6 is located on the same side surface of the power switch 1 as the primary circuit contact element 3. The communication contact element 6 is connected electrically-conductively to the connection unit 4 via a power switch communication line 9 routed within the power switch 1. A further analysis of the power switch 1 can be ultimately undertaken via the power switch accessory module 5.

Contacting the power switch 1 via the primary circuit contact element 3 and the communication contact element 6 thus enables a complete connection to the power switch 1 to be made, so that no further cabling is necessary. The receiving module 2 is provided for such contacting. The receiving module 2, which is located in a switching cabinet, has the primary circuit mating contact element 7 as well as a communication mating contact element 8 for this purpose. The communication mating contact element 8 is located on the same side surface of the receiving module 2 as its primary circuit mating contact element 7. The communication mating contact element 8 is movably supported in an orthogonal direction to the side surface from which the communication mating contact element 8 protrudes. For this purpose part of the communication mating contact element 8 in this exemplary embodiment is supported by means of the spring 16 orthogonal to the side surface of the receiving module 2. In the maximum position (unstressed state) of the communication mating contact element 8 the position of the communication contact element 8 intended for contact with the communication contact element 6 is spaced further away from the side surface of the receiving module 2 than it is in the state in which the power switch 1 is in direct electrically-conductive contact with its primary circuit contact elements 3 with the primary circuit mating contact elements 7.

FIG. 1 shows a state in which the power switch 1 is not coupled to the receiving module 2. In this case neither the primary circuit contact element 3 is connected electrically-conductively to the primary circuit mating contact element 7 nor is the communication contact element 6 connected to the communication mating contact element 8.

The primary circuit mating contact element 7 is connected electrically-conductively via the primary circuit contact element 3 to the primary circuit (circuit) of a system to be monitored. Likewise the communication mating contact element 7 is connected electrically-conductively to an evaluation unit. Ultimately the power switch accessory modules 5 connected to the power switch 1 can be evaluated by this evaluation unit. The evaluation unit can be located directly within the receiving module 2 but can also be connected electrically-conductively outside the receiving module 2 to the receiving module 2 and especially be connected to the communication mating contact element 8.

Figure 2:
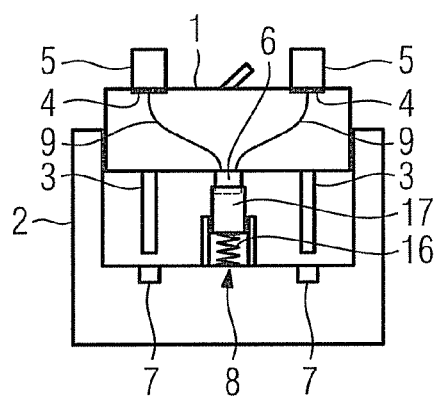
FIG. 2 shows the power switch system from FIG. 1, whereby the receiving module has received the power switch in the first receiving position.

FIG. 2 shows the power switch system from FIG. 1, whereby the receiving module 2 has received the power switch 1 in the first receiving position. It is evident that the communication contact element 6 of the power switch 1 is making contact with the communication mating contact element 8 of the receiving module 2. The primary circuit contact element 3 on the other hand is safely spaced away from the primary circuit mating contact element 7, so that no electrically-conductive connection is present. In this first receiving position there is thus already electrically-conductive contacting between the power switch accessory modules 5 and the receiving module 2. Communication and/or energy supply to the power switch accessory modules 5 can thus take place via the electrically-conductive connection between the receiving module 2 and the power switch accessory modules 5.

An evaluation unit, which is integrated into the receiving module 2 or is connected to the receiving module 2, can thus already communicate in the first receiving position with the power switch accessory modules 5, without the primary circuit already to be monitored having to be connected to the power switch module 1. The primary circuit contact elements 3 are spaced in this case away from the primary circuit mating contact elements 7 such that there is secure electrical isolation between the primary circuit contact element 3 and an opposing primary circuit mating contact element 7.

If the power switch 1 is now moved or cranked further in the direction of the receiving module 2, a part 17 of the communication mating contact element 8 is pushed into the communication mating contact element 8. This movably-supported part 17 is sprung-supported via a spring within the communication mating contact element 8. The fact that the power switch 1 is moved further in the direction of the receiving module 2 compresses the spring 16 and the sprung-supported part 17 is moved in the direction of the communication mating contact element 8 from which the communication mating contact element 8 protrudes from the receiving module 2. The sprung support enables mechanical damage to the communication mating contact element 8 to be avoided.

During the entire push-in phase of the sprung supported part 17, an electrically-conducting connection exists between the communication contact element 6 and the receiving module 2. The power switch 1 is moved far enough into the receiving module 2 for secure contact eventually to be made between the primary circuit contact element 3 and the primary circuit mating contact element 7. This state is illustrated by FIG. 3.

Figure 3:
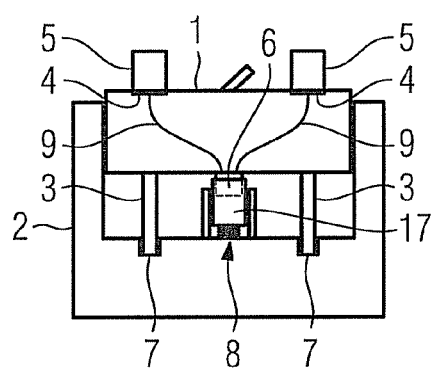
FIG. 3 shows the power switch system from FIG. 1 and FIG. 2, whereby the receiving module has received the power switch in the second receiving position.

FIG. 3 shows the power switch system from FIG. 1 and FIG. 2, whereby the receiving module 2 has received the power switch 1 in the second receiving position. It is evident that there is both an electrically-conductive connection between the primary circuit contact element 3 and the primary circuit mating contact element 7 and also between the communication contact element 6 and the communication mating contact element 8. The power switch 1 is thus located in its final position within the receiving module. Within this end position (second receiving position) the power switch operates in an orderly fashion, so that a current of a system connected to the power switch 1 can be monitored. The power switch accessory modules 5 are electrically-conductively connected to the respective connection units 4. These connection units 4 are electrically-conductively connected via a power switch communication line 9 to a communication contact element 6. This communication contact element 6 is in its turn electrically-conductively connected via a communication mating contact element 8 to the receiving module 2, so that the receiving module 2 can communicate with the power switch accessory modules 5 over the available electrically-conductive connection.

Furthermore energy can be supplied to the power switch accessory modules 5 over the available electrically-conductive connection. The power switch 1 can thus be prepared outside a switching cabinet i.e. provided with power switch accessory modules 5, and only has to be coupled to a receiving module 2. In this case the power switch 1 can be connected in a first receiving position to the receiving module 2 such that there is merely a connection between the communication contact element 6 and the communication mating contact element 8, so that communication can already take place between the receiving module 2 and the power switch accessory modules 5. Only in a further coupling step is there electrically-conductive connection between the primary circuit to be monitored and the power switch 1. The step-by-step coupling process of the power switch 1 to the receiving module 2 enables an orderly and secure connection of the power switch 1 to the receiving module 2 to be guaranteed. The fact that the communication mating contact element 8 has a movably-supported part especially enables a space-saving and secure contacting with the corresponding communication contact element 6 to be established.

Figure 4:
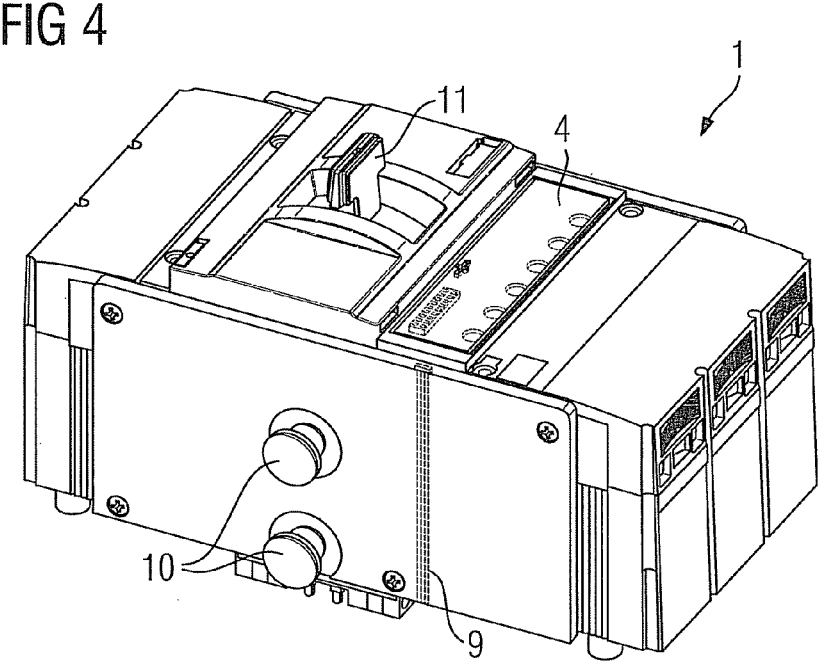
FIG. 4 shows a perspective diagram of a power switch.

FIG. 4 shows a perspective diagram of a power switch 1. It is evident from this diagram that the power switch 1 has a handle 11 on its upper side for mechanical actuation of the power switch 1. The power switch 1 shown also has a connection unit 4. Power switch accessory modules can be connected directly or indirectly via this connection unit to the power switch 1 via individual wiring. The connection unit 4 is connected electrically-conductively via a power switch communication line to the communication contact elements. The communication contact elements are located on the opposite side of the connection unit 4. The power switch communication line 9 is arranged in this case within the housing of the power switch 1. A mating holder element 10 enables the power switch 1 to be coupled mechanically to a receiving module.

Figure 5:
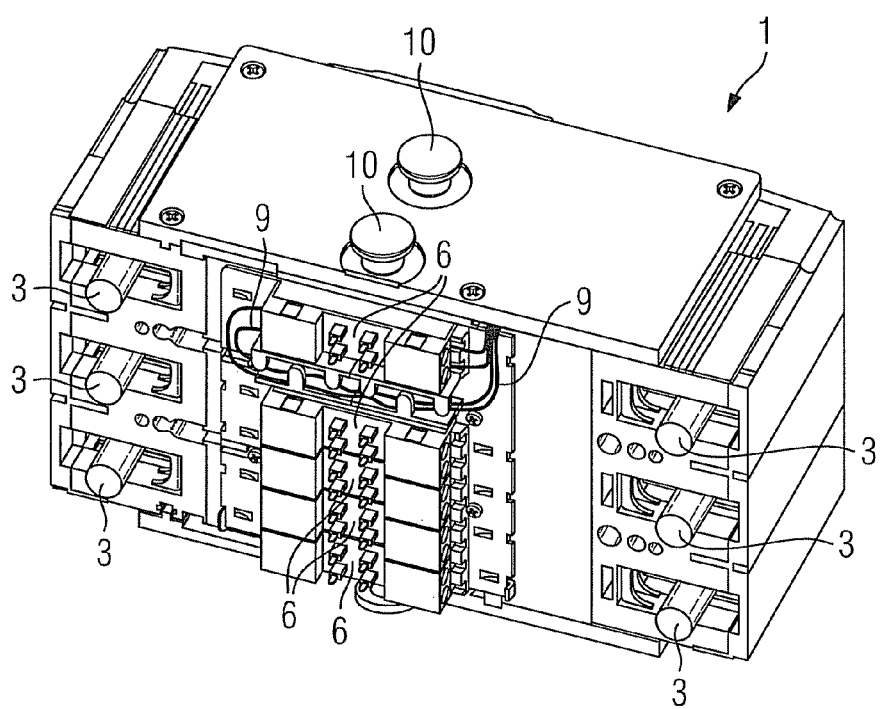
FIG. 5 shows a perspective view of the underside of the power switch shown in FIG. 4.

FIG. 5 shows a perspective view of the underside of the power switch 1 shown in FIG. 4. The contact elements provided for contact with a receiving module are especially evident in this figure. The power switch 1 has a number of primary circuit contact elements 3 for electrical connection to a primary circuit of a system to be monitored. In this case the primary circuit contact element 3 comprises in each case two primary circuit contact element contact pins lying opposite each other in the longitudinal direction. A current to be monitored can be routed through the power switch 1 in each case and monitored via the two primary circuit contact element contact pins. The power switch thus monitors three primary circuits.

A communication contact element 6 is arranged in each case between a primary circuit contact element contact pin pair. This communication contact element 6 is arranged centrally between the two primary circuit contact element contact pins. The communication contact element 6 is connected electrically-conductively via a power switch communication line 9 to the opposing connection unit. Where a power switch accessory module is connected to the connection unit, there is an electrically-conductive connection between the power switch accessory module and the communication contact element 6. There can thus be communication with the power switch accessory modules via the communication contact element 6. The power switch shown here has five communication contact elements 6. A communication contact element consists in this case of four individual communication contact pins. The number of communication contact pins as well as communication contact elements 6 can vary however as a function of the power switch 1.

The power switch 1 can be coupled both electrically and mechanically via the holder mating element 10 to a receiving module, which is preferably located in a switching cabinet. In such cases, in accordance with an embodiment of the invention, the communication contact elements 6 are first contacted with the receiving module and subsequently the primary circuit contact elements 3 are contacted with the receiving module. In this coupling process, in a first receiving position of the power switch 1, electrical contacting of the communication contact elements 6 with the receiving module is guaranteed with simultaneous secure electrical isolation of the primary circuit contact elements from the receiving module.

Figure 6:
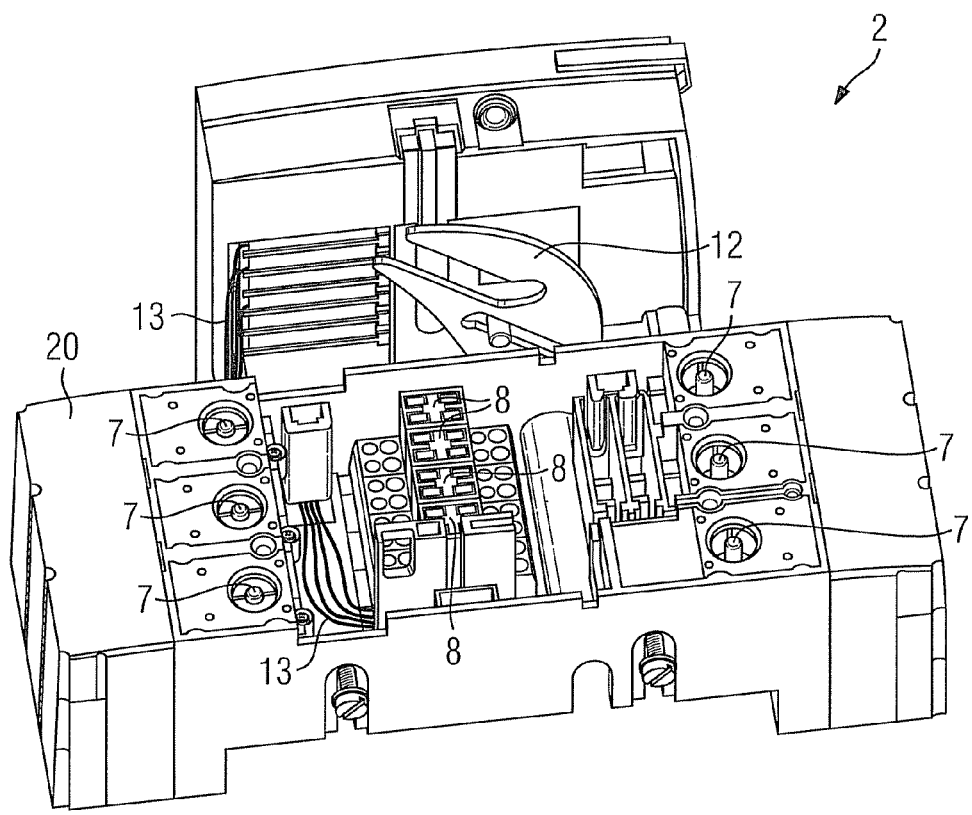
FIG. 6 shows a perspective view of a receiving module, which is embodied to receive a power switch.

FIG. 6 shows a perspective view of a receiving module 2 which is embodied for receiving a power switch. The receiving module 2 is especially dimensioned in this case so that the power switch shown in FIGS. 4 and 5 can be received. The receiving module shown in the figure is embodied to be built into a switching cabinet. A power switch is ultimately electrically and also mechanically connected to a part of the upper side 20 of the receiving module 2 such that a connection between communication mating contact elements 8 and primary circuit mating contact elements 7 is made electrically-conductively with the associated contact elements of the power switch 1. In this case the receiving module 2 can assume at least two different switch positions/receiving positions. The receiving module 2 shown here makes possible three different switch positions in relation to a power switch to be coupled.

In a first stage of coupling the power switch is initially connected purely mechanically to the receiving module 2, so that a first switching position of the power switch is assumed in relation to the receiving module 2. In the first switching position there is no electrically-conductive connection between the primary circuit mating contact elements 7 and the primary circuit contact elements of the power switch or between the communication mating contact elements 8 and the communication contact elements of the power switch.

If, in a further stage of coupling, the power switch is now moved in the direction of the upper side 20 of the receiving module 2, the power switch assumes a second switching position in relation to the receiving module 2 (first receiving position of the power switch). In this position just the communication mating contact elements 8 are connected electrically-conductively to the associated communication contact elements, so that communication can take place via said contact elements with a power switch accessory module which is connected to the power switch. The primary circuit mating contact elements 7 are securely spaced away from the primary circuit contact elements of the power switch, so that no current can flow between the two contacts. Within this switching position the accessory module coupled to the power switch can be tested or can have parameters set for it. Complete communication with the power switch accessory module can thus take place via the receiving module 2.

The communication mating contact elements 8 are electrically-conductively connected by means of a receiving module communication line 13 to an evaluation unit. The evaluation unit can thus already communicate within this switching position with the power switch accessory modules. This communication can be embodied unilaterally or bilaterally. The evaluation unit can be integrated within the receiving module 2, but it is however also conceivable for an externally-arranged evaluation unit to be connected to the receiving module 2, so that there can be communication with the power switch accessory modules via the receiving module 2. The receiving module communication lines 13 are already integrated into the receiving module 2 during manufacturing.

Only in a subsequent third coupling step is the third switching position (second receiving position of the power switch) between the power switch and the receiving module 2 assumed. This switching position forms the working position of the power switch. In this position both the primary circuit mating contact elements 7 and also the communication mating contact elements 8 are connected electrically-conductively with their associated contact elements of the power switch. The primary circuit to be monitored is thus directed to the power switch through the receiving module 2, so that this can be routed via the power switch. The communication mating contact element 8 is connected electrically-conductively as from the second switching position (first receiving position) up to and including the third switching position (second receiving position) to the communication contact elements of the power switch. The fact that the communication mating contact elements 8 have a sprung-supported part enables electrical contacting between the first receiving position and the second receiving position to be ensured. Mechanical damage to the communication mating contact elements 8 can also be avoided by this arrangement.

The process of coupling the power switch to the receiving module 2 can be controlled by a holder. In this case the holder 12 acts with the holder mating element of the power switch such that mechanical coupling of the power switch with the receiving module can be ensured by the holder 12. In addition the holder enables safe movement into the respective switching position/receiving position. An end user can thus explicitly move the switch into the desired switch position by means of the receiving module 2.

In FIGS. 7 through 9 the communication contact element 6 and also communication mating contact element 8 will be shown in greater detail and also described. In particular the individual stages of coupling steps the communication contact element 6 with the communication mating contact element 8 are shown. In this case just the communication contact element 6 of the power switch of FIG. 4, 5 as well as the associated communication mating contact element 8 of the receiving modules of FIG. 6 are depicted.

FIG. 7a shows an arrangement of the communication contact element 6 in relation to the communication mating contact element 8 in the first switching position. FIG. 7b shows a sectional diagram of the arrangement depicted in FIG. 7a, so that the inner structure of the communication contact element 6 and also of the communication mating contact element 8 is visible.

It can be seen that the communication contact element 6 has four communication contact pins 14 in each case. These communication contact pins 14 are attached mechanically rigidly within the communication contact element 6 and are connected electrically-conductively to the connection unit of the power switch. A power switch accessory module coupled to the power switch is connected electrically-conductively to these communication contact pins 14. The receiving module, which is designed to receive the power switch, has the communication mating contact element 8. This communication mating contact element 8 possesses a sprung-supported part 17. This sprung-supported part 17 can be moved in the direction of the side directed towards the receiving module. This sprung-supported movable part 17 has a communication mating contact contact element 15 for each communication contact pin 14. This communication mating contact contact element 15 is arranged within the sprung-supported part 17 such that, provided the communication contact pins 14 protrude into the sprung-supported part 17 of the communication mating contact element, an electrically-conductive connection is established between the communication contact pin 14 and the communication mating contact contact element 15. The communication mating contact contact element 15 is connected electrically-conductively on the side 19 directed towards the receiving module in each case to a contact rail 18.

If the sprung-supported part 17 is thus moved in the direction towards the side 19 directed towards the receiving module, it is ensured by the contact rail 18 and the associated element of the communication mating contact contact element 15 that there is an electrical connection between the two elements. The sprung-supported part 17 is supported by means of a spring within the communication mating contact element 8 such that the sprung-supported part 17, in the unstressed state, is spaced as far as possible from the side 19 directed towards the receiving module.

In the state of the communication contact element 6 depicted by FIGS. 7*a* and 7*b* in relation to the communication mating contact element 8 the power switch is merely coupled mechanically to the receiving module. There is no electrically-conductive connection either between the communication contact element 6 and the communication mating contact element 8 or between the primary circuit contact element 3 and the primary circuit mating contact element 7.

FIG. 8*a* and FIG. 8*b* show an arrangement of the communication contact element 6 in relation to the communication mating contact element 8 in the first receiving position of the power switch in the receiving module. FIG. 8*b* shows a sectional diagram of the arrangement depicted in FIG. 8*a*. It can be seen that in each case the communication contact pin 14 electrically-conductively contacts the communication mating contact contact element 15. The communication mating contact contact element 15 is arranged within the sprung-supported part 17 of the communication mating contact element 8. The non-movably-supported part of the communication mating contact contact elements 8 has a funnel-shaped element via which the guidance of the movably-supported part 17 is made possible. The funnel-shaped element also has contact rails 18 which ensure an electrically-conductive connection between the communication mating contact contact elements 15 and a cable connection element 21 connected to the contact rail 18.

A further electrically-conductive connection of the communication path can be made by this cable connection element 21. The fact that the communication mating contact contact element 15 is supported movably within the communication mating contact element 8 enables contacting with the communication contact pins 14 to be ensured in relation to the receiving module despite spatial changes to the communication contact pins 14. The funnel-shaped element and/or the contact rails 18 are preferably aligned orthogonally to the side surface 19.

In the switching position shown by FIGS. 8*a* and 8*b* an electrically-conductive connection is ensured between the communication contact element 6 and the communication mating contact element 8. In this way there can be communication via the receiving module with a power switch accessory module connected to the power switch. Furthermore the power switch accessory module can be supplied with energy via this connection. The primary circuit contact element is not electrically-conductively connected to the primary circuit mating contact element in this switching position. Such a switching position between the power switch and the receiving module can especially be used for testing or for setting parameters for the power switch accessory modules.

Figure 9A:
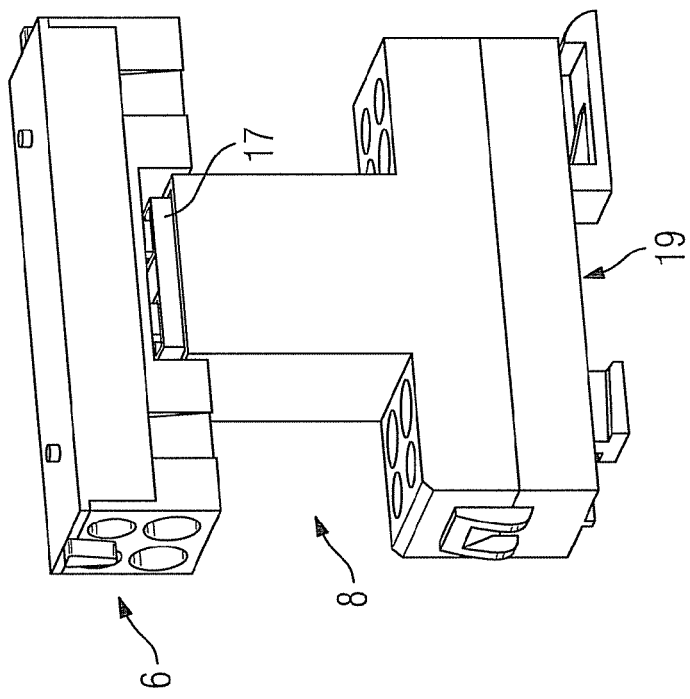
FIG. 9 shows an arrangement of the communication contact in relation to the communication mating contact element, in the second receiving position of the power switch in the receiving module.
Figure 9B:
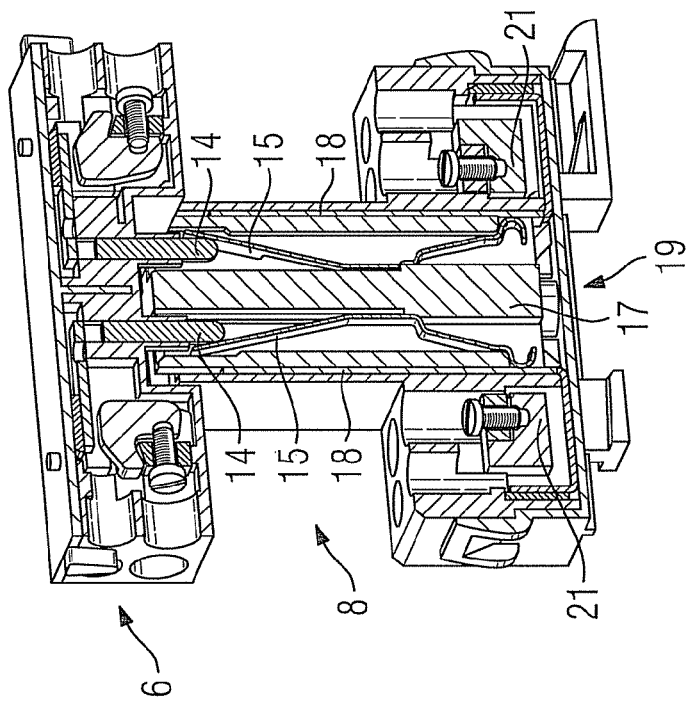

FIGS. 9*a* and 9*b* show an arrangement of the communication contact element 6 in relation to the communication mating contact element 8, in the second receiving position of the power switch in the receiving module. FIG. 9*b* shows a sectional diagram of the arrangement depicted in FIG. 9*a*. It is evident that the sprung-supported part 17 of the communication mating contact element 8 has been moved in the sleeve-like body of the communication mating contact element 8. The side surface of the communication mating contact element 8 directed towards the communication contact element 6 is thus, by comparison with FIG. 8, at a smaller distance from the side surface 19 of the communication mating contact element 8 directed towards the receiving module. So that the second receiving position is reached, the power switch must be moved further in the direction of the receiving module. In this case the movably-supported part 17 of the communication mating contact element 8 is moved in the direction of the side surface 19. The contact rail 18 and the communication mating contact contact element 15 ensure that the electrically-conductive connection is permanently maintained between the communication contact pins 14 and the communication mating contact elements 15 to the receiving module. The communication mating contact contact element 15 slides along the contact rail 18 with a movement in the direction of the side surface 19. In this case a force is exerted in the direction of the contact rails 18 by the communication mating contact contact element 15, so that a permanent electrical contact is ensured. In this case the communication mating contact contact element 15 is arranged within the sprung-supported part 17 such that the communication mating contact contact element 15 on the one hand exerts a mechanical compression force on the contact rail 18 and also a compression force on the communication contact pin 14. An electrically-conductive connection to the receiving module is ensured by the contact rail 18.

An evaluation unit connected indirectly to the contact rail or to the cable connection element 21 can thus communicate with a power switch accessory module without a separate individual wiring to the power switch accessory module being necessary. Within this switch position or in the second receiving position of the power switch in the receiving module, the primary circuit contact element of the power switch is electrically-conductively connected to the primary circuit mating contact element of the receiving module, so that the power switch can monitor at least one primary circuit.

Figure 10:
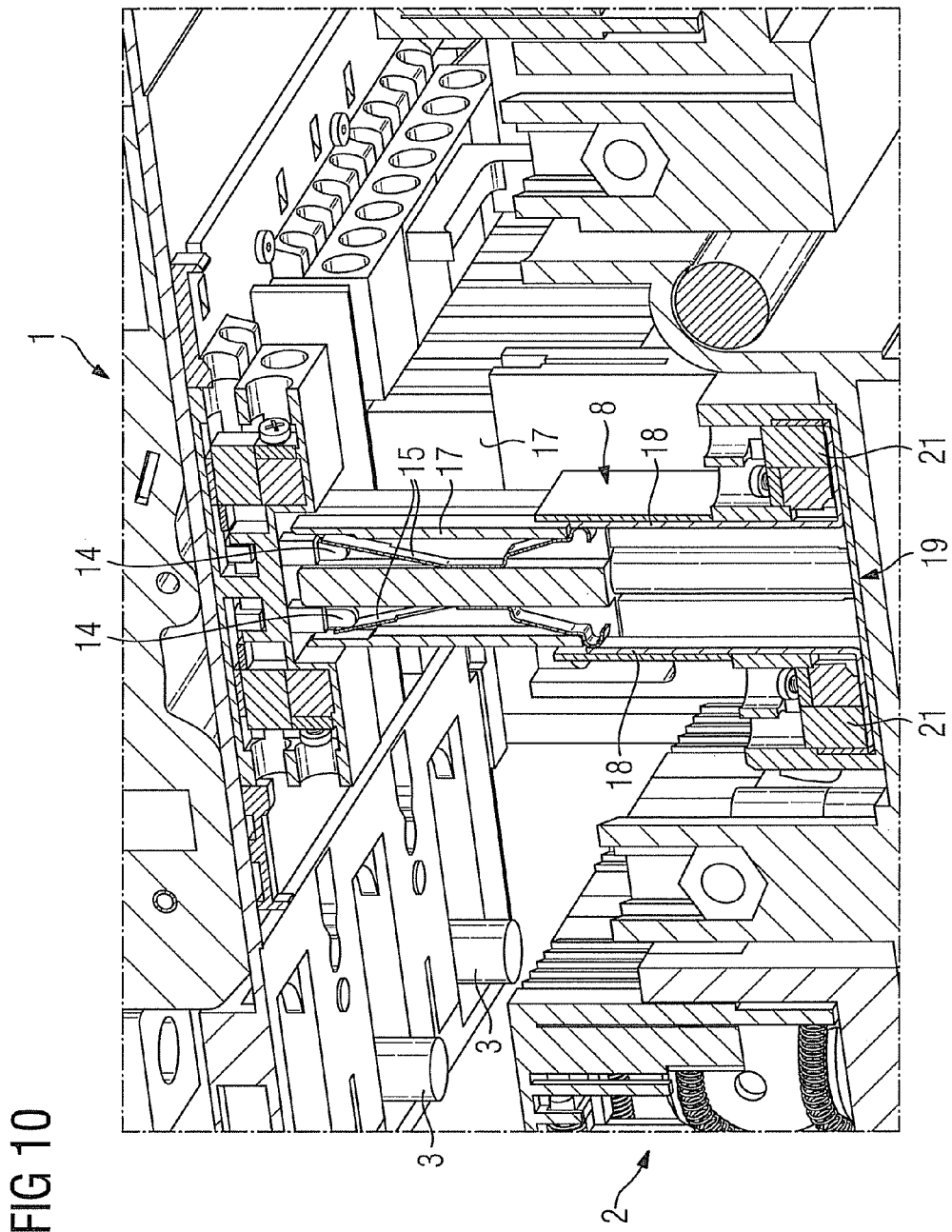
FIG. 10 shows a perspective diagram of a section of a power switch in relation to a section of a receiving module in the first receiving position.

FIG. 10 shows a perspective view of a section of a power switch 1 in relation to a section of a receiving module 2 in the first receiving position. The communication contact element and also the communication mating contact element 8 shown in FIGS. 7 to 9 are built into the power switch 1 or the receiving module 2 respectively. In this case a communication contact element and a communication mating contact element 8 are depicted in cross-section so that some of their contacts are visible. It can be seen that the communication contact pins 14 make contact with the communication mating contact contact elements 15 electrically-conductively. The communication mating contact contact elements 15, which are supported within the sprung-supported part 17 of the communication mating contact elements 8, make contact via the side of the contact rail directed towards the receiving module. The contact rail 18 is electrically-conductively connected on the side surface 19 directed towards the receiving module 2 to a cable connection element 21 in each case, so that an evaluation unit electrically-conductively connected to this cable connection element 21 can communicate with a power switch accessory module.

It can be seen that the primary circuit contact elements 3 of the power switch 1 are not electrically-conductively connected to the receiving module 2. The primary circuit contact elements 3 are thus electrically isolated from the receiving module 2. Within this switching position (first receiving position) parameters can be set or a diagnosis of a power switch accessory module can in particular be undertaken via the receiving module 2.

The inventive receiving module of at least one embodiment consequently enables at least two receiving positions of the power switch to be assumed in the receiving module. In the first receiving position the communication mating contact element is connected electrically-conductively to the communication contact element and the primary circuit mating contact element is not connected electrically-conductively to the primary circuit contact element. In the first receiving position the primary circuit mating contact element is securely electrically isolated from the primary circuit contact element so that no electrically-conductive connection can be made.

A power switch accessory module which is mounted on the power switch for example, is preferably electrically-conductively connected through a power switch communication line routed in the power switch to the communication contact element. Consequently, in the first receiving position, an electrically-conductive connection already exists between the communication mating contact element and the power switch accessory module connected to the power switch. Consequently there can already be communication between the power switch accessory module and the receiving module or an evaluation unit connected to the receiving module. For this the communication mating contact element must merely be connected at least electrically-conductively to the evaluation unit. A primary circuit to be monitored by the power switch is not yet connected electrically-conductively in the first receiving position to the primary circuit contact elements of the power switch, whereby on the other hand communication with the power switch and especially a power switch accessory module can already be undertaken via the receiving module.

The evaluation unit which is electrically-conductively connected to the communication mating contact element can thus already communicate with the power switch. The evaluation unit in this case can be arranged within the receiving module but also decentrally to the receiving module. Consequently for example communication or signal output between the power switch accessory module and the receiving module can already take place. Communication can be bidirectional or unidirectional. The receiving module thus ensures that within the first receiving position the primary circuit mating contact element is not connected electrically-conductively to the primary circuit contact element, whereas the communication mating contact element is electrically connected to the communication mating contact element, so that for example for test purposes there can already be communication with the power switch accessory module.

Only through the further stage of coupling the power module to the receiving module is the second receiving position assumed. In this coupling stage the power switch is preferably moved further in the direction of the receiving module. In the second receiving position, which preferably forms the end position of the power switch in the receiving module, the primary circuit mating contact element is electrically-conductively connected to the primary circuit contact element and the communication mating contact element is electrically-conductively connected to the communication contact element. The power switch is thus coupled for monitoring a primary circuit of a system to be monitored correctly to the receiving module and ultimately via this module to the primary circuit of the system to be monitored.

An embodiment of the inventive method thus enables two switch positions to be ensured. In the first switch position (first receiving position) communication is already possible between the receiving module and the power switch, whereas the primary circuit of the system to be monitored is securely isolated from the power switch. In the second switch position (second receiving position) the power switch is connected/is able to be connected via the receiving module to the primary circuit. There is also a direct communication connection between the power switch and the receiving module. The power switch can thus, before it assumes its ultimate operating position, assume a first intermediate position (first receiving position), in which by means of the receiving module there can especially be communication with a power switch accessory module.

A primary circuit contact element and primary circuit mating contact element are each preferably embodied by two contact elements (e.g. pins and/or sockets).

A communication contact element and/or communication mating contact element can be embodied in each case by one contact element (e.g. contact pin and/or contact socket) but can also be embodied from a number of contact elements.

Preferably the electrically-conductive connection between the communication contact element and the communication mating contact element, in the step of coupling the power switch to the receiving module from the first receiving position to the second receiving position remains uninterrupted.

The term direct connection is especially to be understood as a direct connection between two elements.

In an advantageous form of embodiment of the invention the communication mating contact element and the primary circuit mating contact element are arranged on the same side surface of the receiving module.

In this case the communication mating contact element is preferably arranged between the primary circuit mating contact elements of the receiving module. The communication mating contact element is preferably arranged here centrally between the primary circuit mating contact elements (which consists for example of two primary circuit mating contact element sockets).

In a further advantageous form of embodiment of the invention the receiving module includes a holder which can fix the power switch mechanically in the first receiving position and in the second receiving position.

The holder thus enables the power switch, without any action by an end user, to be mechanically fixed in the receiving module. The power switch can thus be fixed to the receiving module mechanically within the first receiving position securely and stably by the receiving module such that there is only one electrical connection between the communication mating contact element and the communication contact element and no electrical connection between the primary circuit mating contact element and the primary circuit contact element. The holder also enables the receiving module, in the second receiving position to ensure that both the communication mating contact element is electrically-conductively connected to the communication contact element (communication path) and also the primary circuit contact element is electrically-conductively connected to the primary circuit mating contact. The holder in this case preferably establishes a mechanical active connection to a holder mating element of the power switch.

Preferably the receiving module can further mechanically fix the power switch in a third receiving position. Within this third receiving position the communication mating contact element is not electrically-conductively connected to the communication contact element nor is the primary circuit mating contact element is electrically-conductively connected to the primary circuit contact element. For a mechanical coupling of the power switch to the receiving module it would thus be the third receiving position that is assumed, in which no electrical contact is made between the primary circuit mating contact element and communication mating contact element to the power switch. Through a subsequent second coupling process to be undertaken the power switch assumes the second receiving position within the receiving module, in which, preferably for test purposes, only the communication contact element is electrically-conductively connected to the communication mating contact element of the receiving module.

In a further subsequent coupling step the power switch ultimately assumes the second receiving position and thus its end position, in which the primary circuit and also the communication branch between the power switch on the receiving module is electrically-conductively connected. The receiving module thus enables the power switch to be securely connected to the receiving module and thereby the contacts of the power switch to be connected to the contacts of the receiving module. The intermediate position (first receiving position) enables the accessory module of the power switch to be tested or to have parameters set for example without already closing the primary circuit.

In a further advantageous form of embodiment of the invention the power switch can explicitly assume the first and the second receiving position via the holder.

The fact that the power switch can explicitly assume the first and the second, and if present, the third receiving position, enables an end user to explicitly move the module to the different receiving positions/switching positions. The respective switching position can preferably be indicated, e.g. optically, acoustically or also mechanically. An end user, when coupling the power switch into the receiving module, can thus move to the switching positions securely and reliably and thus explicitly.

In a further advantageous form of embodiment of the invention a part of the communication contact mating element is supported in a sprung fashion in an orthogonal direction to the side surface of the receiving module from which the communication mating contact element protrudes.

The sprung support is preferably embodied such that the sprung-supported part of the communication mating contact element is pushed away from the side surface of the receiving module. The sprung-supported part can thus be moved in the direction of the side surface of the receiving module. For this to be done a spring force must be overcome. A part of the communication mating contact element is thus supported movably in an orthogonal direction to the side surface of the receiving module.

In the first receiving position the sprung-supported part is preferably spaced further away from the side surface of the receiving module than in the second receiving position. In the second receiving position the spring is preferably more heavily compressed by comparison with the first receiving position. The communication mating contact element preferably establishes an electrically-conductive connection from the side of the sprung-supported part directed towards the power switch through to the side surface of the receiving module. This electrical connection is preferably maintained without interruption during the movement of the sprung-supported part to the side surface. The fact that the communication mating contact element includes a sprung-supported part enables an extremely compact connection between the power switch and the receiving module to be made. The sprung-supported part can preferably be moved up to around 45 mm in the direction of the side surface of the receiving module.

In a further advantageous form of embodiment of the invention, in the first receiving position the sprung-supported part is at a greater distance from the side surface of the receiving module than it is in the second receiving position.

In a further advantageous form of embodiment of the invention the sprung-supported part is supported within the communication mating contact element.

The sprung-supported part can thus be guided within the communication mating contact element. The internal arrangement also shields the moving/sprung-supported part from environmental influences, such as dirt or dust for example.

In a further advantageous form of embodiment the invention comprises the communication mating contact element, an electrically-conductive sprung supported communication mating contact element within a material that is a poor electrical conductor, for making direct contact with the communication contact element, whereby the communication contact mating contact element establishes an electrically-conductive connection between the communication contact mating contact element and the side surface of the communication mating contact element via an electrically-conductive contact rail on an inner side of a material that is a poor electrical conductor, with which the communication mating contact element is attached to the receiving module.

An electrically-conductive connection is thus preferably made between the side of the communication mating contact element facing towards the power switch and the opposing side surface of the communication mating contact element. The communication mating contact element consequently has an end-to-end electrically-conductive connection in the orthogonal direction to the side surface of the receiving module.

The material that is a poor electrical conductor is typically an insulating plastic, whereas an electrically-conductive material is copper for example. The spatial arrangement of the electrically-conductive material in relation to the electrically poorly-conducting material shields the contact from interference sources, such as dirt for example. The communication mating contact contact element is spaced in the first receiving position further away from the side surface of the receiving module than it is in the second receiving position. The sprung-supported communication mating contact element enables contact between the communication mating contact element and the communication contact element of the power switch to be ensured over a spatial distance. The power switch can consequently be moved further in the direction of the side surface of the receiving module, without electrical contact between the communication mating contact element and the communication contact element being interrupted. For this the communication mating contact contact element is preferably connected via an electrically-conductive rail to an underside of the communication mating contact element during the entire process of movement from the first receiving position into the second receiving position.

In a further advantageous form of embodiment of the invention the communication mating contact element includes an electrically-conducting material as well as a material that is a poor electrical conductor, whereby a part of the poorly electrically-conducting material has form similar to that of a sleeve in which a part of the electrically-conducting material is arranged. Preferably the sleeve-like form extends in an orthogonal direction to the side surface of the receiving module from which the communication mating contact element protrudes. The poorly electrically-conducting material especially shields the electrically-conducting material against environmental influences. Preferably the communication mating contact element has a shape similar to that of the telescope so that the communication mating contact element can be spaced differently away from the side surface of the receiving module. In this case a spring is preferably integrated such that, provided there is no mechanical strain on the communication mating contact element, a maximum distance from the side surface is assumed.

In a further advantageous form of embodiment of the invention the primary circuit contact element and the primary circuit mating contact element and/or the communication contact element and communication mating contact element are embodied by a number of connections. Provided a power switch has a number of primary circuits or communication paths, these are preferably mapped in each case by primary circuit contact elements and primary circuit mating contact elements or communication contact elements and communication mating contact elements are able to be connected to one another.

In a further advantageous form of embodiment of the invention the receiving module comprises an evaluation unit connection point, whereby the evaluation unit connection point is electrically-conductively connected to the communication mating contact element.

An evaluation unit can be connected to the connection module via the evaluation unit connection point. The evaluation unit is especially embodied for communication with a power switch accessory module. The evaluation unit connection point is preferably arranged on an outer side of the receiving module, so that in the coupled state with a power switch (within the first receiving position or the second receiving position) communication can take place with a power switch accessory module connected to the power switch via the evaluation unit connection point. If the first and also the second receiving position are present, an electrically-conductive connection is available between the evaluation unit connection point and a connection unit of the power switch provided for a power switch accessory module. Separate cabling of the power switch accessory to an evaluation unit is thus not necessary.

It is likewise conceivable for the evaluation unit to already be integrated into the receiving module so that communication with the power switch accessory module can take place via said unit.

The inventive coupling method of at least one embodiment especially allows a secure connection of a power switch to the receiving module to be provided, in which the power switch can be connected to the receiving module in an orderly manner. In such cases an intermediate position (first receiving position) can be assumed in particular which makes it possible to ensure on the one hand that the primary circuit is not yet closed but communication can still take place between the power switch and the receiving module (e.g. for the purposes of testing a power switch accessory module). This represents an enormous improvement in the process of coupling a power switch to a receiving module. The automatic connection of the communication branch also does away with the complex individual wiring between the power switch or the power switch accessory module(s) and the switching cabinet which would otherwise be required.

To replace the power switch in particular, only the power switch has to be removed from the receiving module and a new power switch coupled to the receiving module. Additional wiring of the communication branch with further components of the switching cabinet can be dispensed with completely since the communication branch of the power switch (the communication contact element) is also connected via the receiving module (by means of the communication mating contact element) to the switching cabinet. Replacing the power switch is thus enormously simplified. Likewise cabling errors can be avoided by the automatic connection of the primary circuit and the communication branch to the receiving module. It is also ensured that no damage is done to the communication mating contact element during the coupling process because of the sprung-supported communication mating contact element, since the movably-supported contact element "penetrates" into the communication mating contact element.

In an inventive power switch system of at least one embodiment, the communication contact element and the primary circuit contact element are embodied in relation to the communication mating contact element and the primary circuit mating contact element such that, when the power switch is coupled to the receiving module, initially an electrically-conductive connection is established between the communication contact element and the communication mating contact element (first receiving position) and only in a second subsequent coupling process is the primary circuit contact electrically connected to the primary circuit mating contact (second receiving position).

In a further advantageous form of embodiment of the invention the power switch has a connection unit for electrically connecting a power switch accessory module, with the least one part of the connection unit being connected electrically-conductively to the communication contact element.

The electrically-conductive connection between the communication contact element and the part of the connection unit is preferably made via a power switch communication line arranged within the power switch. In this way separate cabling of a power switch accessory module can be dispensed with.

In a further advantageous form of embodiment of the invention, in the first receiving position the primary circuit mating contact element is spaced securely away from the primary circuit contact element, so that preferably the primary circuit contact element is electrically isolated from the primary circuit mating contact element even if a voltage is present on the primary circuit mating contact element.

Preferably, from the first stage of coupling up to and including the second stage of coupling, the electrically-conductive connection is established between the communication contact element and the communication mating contact element.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A receiving module for building into a switching cabinet, comprising:
    a primary circuit mating contact element; and
    a communication mating contact element, wherein the receiving module can directly receive a power switch so that a primary circuit contact element of the power switch is directly electrically-conductively connected to the primary circuit mating contact element and a communication contact element of the power switch is directly electrically-conductively connected to the communication mating contact element, wherein the communication mating contact element is arranged in relation to the primary circuit mating contact element such that, in a first receiving position of the power switch in the receiving module the communication contact element is directly electrically-conductively connected to the communication mating contact element and the primary circuit mating contact element is not electrically-conductively connected to the primary circuit contact element and in a second receiving position of the power switch in the receiving module the primary circuit mating contact element is electrically-conductively connected to the primary circuit contact element and the communication mating contact element is electrically-conductively connected to the communication contact element, wherein
        the communication mating contact element comprises an electrically-conductive communication mating contact contact element spring-supported within a material that is a poor electrical conductor, for direct contact with the communication contact element, wherein the communication mating contact contact element establishes an electrically-conductive connection between the communication mating contact contact element and the side surface of the communication mating contact element via an electrically-conductive contact rail arranged on an inner side of a material which is a poor electrical conductor, with which the communication mating contact element is fastened to the receiving module.

2. The receiving module as claimed in claim 1, wherein the communication mating contact element and the primary circuit mating contact element are arranged on a same side surface of the receiving module.

3. The receiving module as claimed in claim 2, further comprising:
    a holder to fix the power switch, mechanically, in the first receiving position and in the second receiving position.

4. The receiving module as claimed in claim 3, wherein the power switch can explicitly assume the first and the second receiving position via the holder.

5. The receiving module as claimed in claim 1, further comprising:
    a holder to fix the power switch, mechanically, in the first receiving position and in the second receiving position.

6. The receiving module as claimed in claim 5, wherein the power switch can explicitly assume the first and the second receiving position via the holder.

7. The receiving module as claimed in claim 1, wherein a part of the communication mating contact element is essentially spring-supported in a direction orthogonal to a side surface of the receiving module, from which the communication mating contact element protrudes.

8. The receiving module as claimed in claim 7, wherein in the first receiving position, the spring-supported part is spaced farther away from the side surface of the receiving module than it is in the second receiving position.

9. The receiving module as claimed in claim 8, wherein the spring-supported part is supported within the communication mating contact element.

10. The receiving module as claimed in claim 7, wherein the spring-supported part is supported within the communication mating contact element.

11. A power switch system comprising:
    a power switch; and
    a receiving module, to receive the power switch, the power switch including a primary circuit contact element and a communication contact element and the receiving module including a primary circuit mating contact element and a communication mating contact element, wherein the receiving module can directly receive the power switch, so that the primary circuit contact element is connected electrically-conductively directly to the primary circuit mating contact element and the communication contact element is connected electrically-conductively directly to the communication mating contact element, wherein at least one of the communication contact element and communication mating contact element are arranged in relation to at least one of the primary circuit contact element and primary circuit mating contact element such that, in a first receiving position of the power switch in the receiving module the communication contact element is directly connected electrically-conductively to the communication mating contact element and the primary circuit mating contact element is not connected electrically-conductively to the primary circuit contact element and in a second receiving position of the power switch in the receiving module the primary circuit mating contact element is connected electrically-conductively to the primary circuit contact element and the communication mating contact element is connected electrically-conductively to the communication contact element, wherein
        the communication mating contact element comprises an electrically-conductive communication mating contact contact element spring-supported within a material that is a poor electrical conductor, for direct contact with the communication contact element, wherein the communication mating contact contact element establishes an electrically-conductive connection between the communication mating contact contact element and the side surface of the communication mating contact element via an electrically-conductive contact rail arranged on an inner side of a material which is a poor electrical conductor, with which the communication mating contact element is fastened to the receiving module.

12. The power switch system as claimed in claim 11, wherein the power switch includes a connection unit for electrical connection of a power switch accessory module, and wherein at least one part of the connection unit is connected electrically-conductively to the communication contact element.

13. A method for coupling a power switch to a receiving module, wherein the power switch includes a primary circuit contact element and a communication contact element and the receiving module includes a primary circuit mating contact element and a communication mating contact element, wherein the communication mating contact element comprises an electrically-conductive communication mating contact contact element spring-supported within a material that is a poor electrical conductor, for direct contact with the communication contact element, wherein the communication mating contact contact element establishes an electrically-conductive connection between the communication mating contact contact element and the side surface of the communication mating contact element via an electrically-conductive contact rail arranged on an inner side of a material which is a poor electrical conductor, with which the communication mating contact element is fastened to the receiving module, the method comprising:

setting the power switch in a first receiving position in the receiving module, for mechanical coupling of the power switch to the receiving module in a first stage of coupling the power switch to the receiving module, in which the communication contact element is directly connected electrically-conductively to the communication mating contact element and the primary circuit mating contact element is not connected electrically-conductively to the primary circuit contact element;

setting the power switch in a second receiving position in the receiving module, for mechanical coupling of the power switch to the receiving module in a subsequent second stage of coupling the power switch to the receiving module, in which the primary circuit mating contact element is connected electrically-conductively to the primary circuit contact element and the communication mating contact element is connected electrically-conductively to the communication contact element; and establishing an electrically-conductive connection between the communication mating contact contact element and the side surface of the communication mating contact element via the electrically-conductive contact rail arranged on the inner side of the material which is a poor electrical conductor, with which the communication mating contact element is fastened to the receiving module.

14. The method for coupling a power switch to a receiving module as claimed in claim 13, wherein the power switch is held mechanically by the receiving module in the first and also the second receiving position.

15. The method for coupling a power switch to a receiving module as claimed in claim 14, wherein, from the first stage of coupling up to and including the second stage of coupling, the electrically-conductive connection is established between the communication contact element and the communication mating contact element.

16. The method for coupling a power switch to a receiving module as claimed in claim 13, wherein, from the first stage of coupling up to and including the second stage of coupling, the electrically-conductive connection is established between the communication contact element and the communication mating contact element.

* * * * *